United States Patent [19]

McLean et al.

[11] Patent Number: 4,739,028

[45] Date of Patent: Apr. 19, 1988

[54] EPOXY FORTIFIERS BASED ON AROMATIC POLYHYDROXYL COMPOUNDS

[75] Inventors: Paul D. McLean, Nepean, Canada; Andrew Garton, Storrs, Conn.; Robert F. Scott, Nepean, Canada

[73] Assignee: Canadian Patents & Development Limited, Ottawa, Canada

[21] Appl. No.: 20,948

[22] Filed: Mar. 2, 1987

[30] Foreign Application Priority Data

Mar. 27, 1986 [CA] Canada .................................. 505493

[51] Int. Cl.$^4$ .............................................. C08G 30/04
[52] U.S. Cl. ..................... 528/103; 525/504; 528/104; 528/87; 528/119; 528/73; 528/93; 528/111; 528/123; 528/124; 528/102; 528/96; 528/365
[58] Field of Search ................... 528/104, 87, 119, 73, 528/93, 111, 123, 124, 103, 102, 96, 365; 525/504

[56] References Cited

U.S. PATENT DOCUMENTS

| | | | |
|---|---|---|---|
| 2,633,458 | 3/1953 | Shokal | 528/387 |
| 3,477,990 | 11/1969 | Dante | 528/87 |
| 3,978,027 | 8/1976 | Marshall | 528/104 |
| 4,105,634 | 8/1978 | Hanson | 528/104 |
| 4,568,735 | 4/1986 | Li | 528/104 |

OTHER PUBLICATIONS

Lee and Neville, The Handbook of Epoxy Resins, 1967, pp. 4-21 and 10-16, 10-17, 10-18.

Primary Examiner—Earl Nielsen
Assistant Examiner—Frederick Krass
Attorney, Agent, or Firm—Alan A. Thomson

[57] ABSTRACT

Epoxy resins have been found to be fortified (increased in strength and modulus yet not made brittle) by compounding:
(a) a resin-forming polyepoxide
(b) an amine curing agent for (a) and
(c) a fortifier for (a)+(b) comprising the reaction product of
  (i) an aromatic polyhydroxy compound and
  (ii) a diepoxide with one epoxy group less reactive than the other:

and heat curing the mixture. Strengths as high as 140 MPa and moduli as high as 4500 MPa have been attained with a ductile mode of failure.

11 Claims, 1 Drawing Sheet

LOAD EXTENSION CURVES FOR EPOXY RESIN CURED WITH MDA, AND CONTAINING
(a) NO FORTIFIER
(b) +30 PHR VCDR FORTIFIER
(c) +30 PHR VCDHQ. SN FORTIFIER

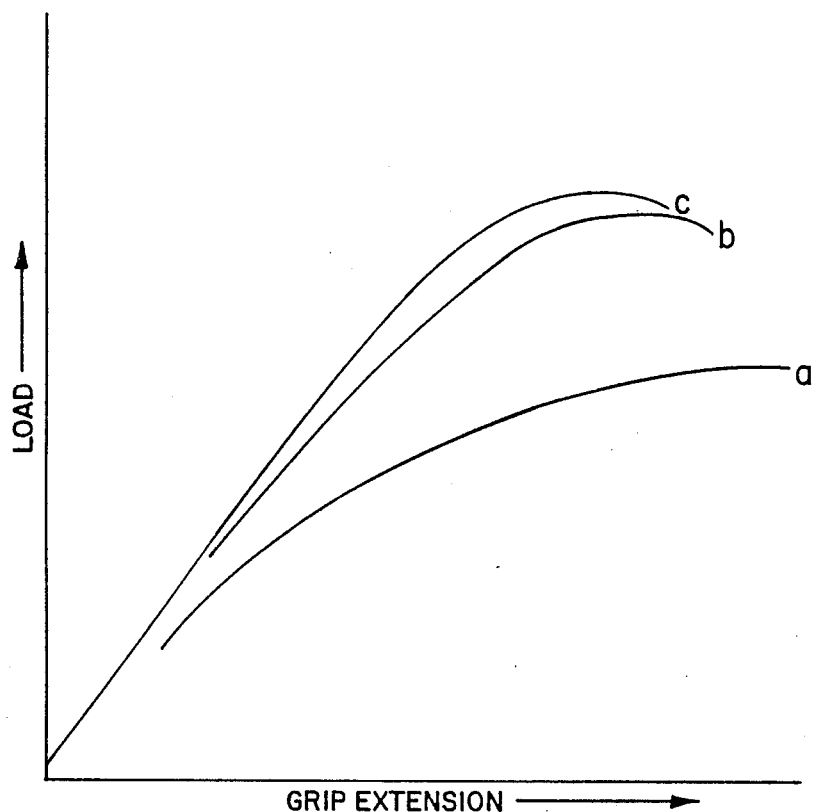
LOAD EXTENSION CURVES FOR EPOXY RESIN
CURED WITH MDA, AND CONTAINING
(a) NO FORTIFIER
(b) +30 PHR VCDR FORTIFIER
(c) +30 PHR VCDHQ. SN FORTIFIER
FIG. I

EPOXY FORTIFIERS BASED ON AROMATIC POLYHYDROXYL COMPOUNDS

This invention relates to epoxy resin systems which have increased strength and modulus without becoming brittle. This fortification has been achieved by the addition of a reaction product of an aromatic polyhydroxy compound and a non-symmetrical diepoxide. (i.e. a diepoxide with one epoxy group less reactive than the other).

BACKGROUND AND PRIOR ART

Epoxy resin matrices are usually two-component systems, comprising a resin component [e.g. a diglycidyl ether of bisphenol A (DGEBA)] and a crosslinking agent [e.g. p,p'diaminodiphenylmethane (DDM)]. Diluents or fillers are also often added for economic or processing reasons. The resin and curing agent are mixed and "cured", usually at elevated temperatures. The above matrix would typically have a strength of 85 MPa, a modulus of 2800 MPa, a glass transition temperature ($T_g$, a maximum use temperature) of ~150° C. and would fracture in an essentially brittle fashion (H. Lee and K. Neville, "Handbook of Epoxy Resins", McGraw-Hill, New York, 1967). Considerable effort has been expended to improve on these properties.

However, no completely satisfactory solution currently exists because improvement in one property has been gained only at the expense of another (e.g. solvent resistance, $T_g$, ductility, processability, cost).

Reaction products of aromatic polyhydroxy compounds and epoxides (particularly epihalohydrins) are widely used in epoxy technology, since the reaction is one step in the synthesis of many epoxy resins. A typical synthesis may involve reacting 1 mole of 4,4'-isopropylidene bisphenol (bisphenol A) with 10 moles of epichlorohydrin at about 115° C., while slowly adding 2 moles of 40% aqueous sodium hydroxide. Excess epichlorohydrin is distilled away and the crude product is purified by washing and filtration to give a resin forming polyepoxide commonly referred to as the diglycidyl ether of bisphenol A (DGEBA). Details of this and other similar syntheses may be found in "Handbook of Epoxy Resins" by H. Lee and K. Neville, McGraw-Hill, New York, 1967.

Antiplasticization in highly crosslinked epoxy resin systems has been reported in the literature as a means of modifying their properties. For instance, N. Hata et al, in J. Appl. Polym. Sci., 17(7), p. 2173-81, 1973, describe pentachlorobiphenyl as the most effective antiplasticizer, and dibutylphthalate and 2,2-bis[4-2-(2-hydroxy-3-phenoxypropoxy)phenyl]propane (a reaction product of DGEBA and phenol) as less effective antiplasticizers. There evidently has been little recent interest in this, possibly because materials such as pentachlorobiphenyl are environmentally objectionable.

We have found an alternative method of improving the properties of epoxy resins, by adding reaction products which act as fortifiers, to conventional epoxy resin+curing agent formulations.

SUMMARY OF THE INVENTION

This invention relates to fortifiers for epoxy resins comprising the reaction products of:

(1) an aromatic polyhydroxyl compound of the formula:

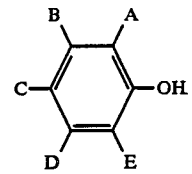

wherein A to E are selected from hydrogen, alkyl, halogen, halogenated alkyl and hydroxyl, with the proviso that at least one of A to E is hydroxyl; and (ii) a diepoxide containing two epoxide groups one of which is less reactive than the other (ie a non-symmetrical diepoxide). Preferably the proportions of (i) to (ii) ensure an excess of epoxide functionality. The invention includes this fortifier for admixture with an epoxy resin. The invention further includes a curable epoxy resin composition comprising the fortifier, curing agent and resin, and this composition when cured to a strong, high modulus solid form. The reaction product of the aromatic hydroxyl compound and the diepoxide may be further reacted with an amide, nitrile or isocyanate to form advantageous fortifiers as described below.

The invention further includes a process for preparing the fortifier comprising heating about 1 mole of the aromatic hydroxyl compound with from about 1-10 moles of the non-symmetrical diepoxide at the equivalent of about 100°-180° C. for about 1-2 hours. The process includes the further steps of compounding the resulting fortifier with a resin-forming polyepoxide and an amine curing agent for said polyepoxide, and heat curing the mixture to form a strong, high modulus solid.

DESCRIPTION OF DRAWINGS

FIG. 1 is a graph showing load vs. extension curves for XD7818 epoxy resin cured with MDA (a) containing no fortifier (b) +30 PHR VCDR (c) +30 PHR VCDHQ.SN. For details of nomenclature see Examples.

DETAILED DESCRIPTION AND PREFERRED EMBODIMENTS

The resin-forming polyepoxide to be fortified can be any of the type known to form epoxy resin matrices and will have a plurality of reactive 1,2-epoxy groups. These resin-forming polyepoxides should be curable by amine curing agents.

These polyepoxide materials can be monomeric or polymeric, saturated or unsaturated, aliphatic, cycloaliphatic, aromatic or heterocyclic, and may be substituted, if desired, with other substituents besides the epoxy groups, e.g. hydroxyl groups, ether radicals, aromatic halogen atoms and the like.

A widely used class of polyepoxides which can be fortified according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenyl methane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g. p-tert-butylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4'-dimethylolbenzene, glycerol, 1,2,6-hexanetriol, trimethylolpropane, mannitol sorbitol, erythritol, pentaerythritol, their dimers, trimers and higher polymers, e.g. polyethylene glycols, polypropylene glycols, triglycerol, dipentaerythritol and the like, polyallyl alcohol, polyhydric thioethers, such as 2,2'-,3,'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols, such as the monochlorohydrins of glycerol, sorbitol, pentaerythritol and the like.

Another class of polymeric polyepoxides which can be cured by means of the amine curing agents and fortified, includes the epoxy novolac resins obtained by reacting, preferably, in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in H. Lee and K. Neville, "Handbook of Epoxy Resins".

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Pat. No. 2,870,170 to Payne et al. Also suitable are polyglycidyl compounds produced by reacting epichlorohydrin with aromatic amines such as aniline, 2,6-dimethylaniline, p-toluidine, m-chloroaniline, p-aminodiphenyl, m-phenylenediamine, p-phenylenediamine, 4,4' diaminodiphenyl methane, or with amino phenols such as p-aminophenol, 5-amino-1-n-naphthol, 4-aminoresorcinol, 2-methyl-4-aminophenol, 2-chloro-4-aminophenol and the like. Specific compounds include, among others, N,N-diglycidylaniline, N,N-diglycidyl-2,6-dimethylaniline, N,N,N',N'-tetraglycidyl-4,4'-diaminodiphenyl methane, the triglycidyl derivative of p-aminophenol wherein the aminohydrogen and OH hydrogen atoms are replaced by glycidyl groups.

It will be appreciated by those skilled in the art that the polyepoxide compositions which can be cured and fortified according to the practice of the present invention are not limited to those containing the above described polyepoxides, but that these polyepoxides are to be considered merely as being representative of the class of polyepoxides as a whole.

The amine curing agents are any aromatic or aliphatic amine curing agents (hardeners) known in the art. Typical examples are methylene dianiline (MDA), metaphenylenediamine and other aromatic polyamines, triethylenetetramine, diethylaminopropylamine, polyoxypropyleneamines and other aliphatic polyamines. Amine adducts such as reaction products of aliphatic amines with epoxide monomers and amino group-containing polyamides are known amine curing agents and would be operative. Heterocyclic amines such as N-aminoethylpiperazine and ethylmethylimidazole may also be used. We prefer the aromatic polyamines particularly when improved high temperature properties are important.

The aromatic polyhydroxyl reactant used to form the fortifier has the general formula I given above, in which A to E are selected from hydrogen, alkyl, halogen, halogenated alkyl and hydroxyl with the proviso that at least one of A to E is hydroxyl. Suitable compounds include resorcinol, 1,2,3 trihydroxybenzene, 1,3,5 trihydroxybenzene, 1,2, dihydroxybenzene, hydroquinone.

The diepoxide reactant contains two vicinal-epoxide rings, one of which is less reactive than the other (for structural or chemical reasons). The reactivity of the less reactive epoxide group may be lower because of, e.g. being attached to an alicyclic moiety or by substituents on the alpha-carbons or because of its steric configuration. Suitable dioxides include vinylcyclohexene dioxide (VCD), limonene dioxide, bis(2,3-epoxycyclopentyl)ether (liquid isomer), and p-epoxycyclopentylphenyl glycidyl ether.

The fortifier is formed by reacting the aromatic hydroxyl compound and diepoxide together at a selected temperature, usually within about 70° C. to 200° C., for a time within about 15 min. to about 5 hr. Preferred reaction conditions are selected to be equivalent to 100°–180° C. for about 1–2 hrs. at a ratio of 1 mole aromatic polyhydroxyl to 1–10 moles of diepoxide. The temperature (and time) are selected to give the desired degree and mode of reaction yet not boil off the more volatile components. Depending on exotherms encountered, it may be necessary to cool the reaction vessel to maintain the desired reaction temperature. Typical temperatures and times found operative are illustrated in the examples. Catalysts can be used to facilitate the reaction if desired. Suitable catalysts for the fortifier formation include those of the type of aminobenzene, aminobenzhydrazide, diethylamine hydrochloride, ethylmethylmethylimidazole, alphamethylbenzyldimethylamine, and 2-hydroxybenzyldimethylamine. Suitable catalyst concentrations range up to about 5%.

The use of a non-symmetrical diepoxide allows the production of relatively low molecular weight materials with residual epoxy functionality. The majority of the residual epoxy functionality corresponds to the less reactive group of the diepoxide. These groups are relatively stable to long term storage but can become involved in crosslinking processes during the elevated temperature cures. Typical values of the Epoxy Equivalent Weight (EEW, the number of grams of fortifier containing one gram-equivalent of epoxy functionality) are given in Table 1 and show that, although the amount of residual epoxide varies with the initial reactant ratio and the processing conditions, the epoxy fortifiers described here are characterised by significant epoxy functionality. For example, the EEW of a typical epoxy resin (Epon 828 [TM]) is about 188, and of vinyl cyclohexene dioxide (VCD) is 76. Higher molecular weight epoxy resins, eg Epon 1010 [TM] have EEW's of >4000.

Epoxy fortifiers as described here are different in composition and effectiveness from reaction products of aromatic polyhydroxy compounds and symmetrical diepoxides, which may be considered simply as partially cured resins. Such partially cured systems may offer advantages in processing or toxicology over conventional epoxy resins, but do not produce the effect on mechanical properties characteristic of epoxy fortifiers.

TABLE 1

| Polyhydroxy | Diepoxide | Ratio | EEW |
|---|---|---|---|
| Resorcinol | VCD | 1:3 | 198 |
| Resorcinol | VCD | 1:4.5 | 144 |
| Resorcinol | VCD | 1:5.5 | 129 |
| Hydroquinone | VCD | 1:4.5 | 147 |

The reaction products are a complex mixture in each case and were used as fortifiers without purification or separation. The reaction products were viscous oils or low melting point solids. Chromatographic analysis of a typical fortifier showed the presence of at least 12 chemical components in measurable amounts. Several fortifiers have been retested after at least one year of storage and they showed no signs of deterioration.

We have found that (in preparing the fortifiers) when only part of the desired amount of one of the reactants is added initially and reacted, and the remainder introduced later, the reaction product is different than if the full amount had been reacted at one time. Using this variation in properties, it is possible to select both reactants and reaction stages to optimize properties of the fortifier for a particular purpose. It is possible to add a different diepoxide at a second stage of the reaction to vary the properties further. In the same manner, variations or staged additions of the same or different aromatic polyhydroxy compound change the properties of the fortifier somewhat. Thus, it is possible to tailor the fortifier to obtain a desired balance of properties for a particular resin system. Further, it is also possible to mix different prereacted fortifiers, for example, to reduce the viscosity of the mixture or to impart other favourable characteristics to the formulation. For each resin-curing agent system, the fortifier is selected to bestow increased tensile strength and modulus on curing.

We have also discovered that these fortifiers may be further reacted with suitable nitriles, amides or isocyanates to give fortifiers which may impart increased strength, ductility or be easier to process than unmodified fortifiers because of their lower viscosity.

Suitable nitrile reactants may be mono or dinitriles. These include p-aminobenzonitrile, phthalonitrile, malononitrile, succinonitrile, butyronitrile, adiponitrile and acrylonitrile. Halogenated derivatives of these nitriles may be used. Normally the amount of nitrile used will be about one half of the number of moles of polyhydroxy compound present in the original fortifier recipe although variations are possible. The reaction conditions for nitriles generally are about one hour at 110° C. although variations are possible.

A suitable amide reactant is acrylamide in molar amounts about one half the number of moles of polyhydroxy compound present in the original fortifier recipe although variations are possible. The reaction conditions with acrylamide are generally about 30 minutes at 110° C. although variations are possible.

A suitable isocyanate reactant is phenyl isocyanate in molar amounts about equal to the number of moles of polyhydroxy compound present in the original fortifier recipe, although variations are possible. The isocyanate is added slowly at room temperature, taking precautions to control the exotherm.

The concentrations of fortifiers relative to the resin (resin-forming polyepoxide) may range from an effective amount up to about 60% based on the weight of resin (PHR). Amounts within the range 10-50 PHR normally are preferred.

The final cure conditions of the resin-forming polyepoxide + amine curing agent + fortifier generally follow conventional epoxy resin cure techniques. Usually at least two cure stages are utilized, with preferred cure sequences being within the ranges:
  initial stage 60°-100° C. for 1 hr.-6 hrs.
  intermediate stage 100°-130° C. for 1 hr.-3 hrs.
  final stage 140°-200° C. for 1 hr.-16 hrs.
Those skilled in the art will be able to determine a suitable cure cycle for any particular system.

The following examples are illustrative.

EXAMPLE 1

Vinyl cyclohexene dioxide (VCD) was mixed with resorcinol (R) at a mole ratio of 3:1 and the mixture was heated to 110° C. for 1 h, taking precautions to control the exotherm, to give a fortifier designated VCDR. This fortifier was mixed with Epon 828 [trademark of a diglycidyl ether of bisphenol-A epoxy resin] containing methylene dianiline (MDA) as a curing agent. Table 2 shows that the tensile strength increased with increasing fortifier concentration, reaching a maximum of 124 MPa at 30 PHR VCDR. The description "ductile" in Table 2 signifies that the slope of the load-deflection curve was negative at failure (see FIG. 1). The term "yield" signifies a slope of zero, and "brittle" signifies a positive slope.

TABLE 2

| Fortifier VCDR, PHR | Epoxy Resin Epon 828 [TM] | Crosslinking Amine PHR | Tensile Strength MPa | Tg °C. |
|---|---|---|---|---|
| — | 100 | 30 | 85 (brittle) | 159 |
| 10 | 100 | 30 | 100 (ductile) | 156 |
| 20 | 100 | 30 | 112 (ductile) | 149 |
| 30 | 100 | 30 | 124 (ductile) | 135 |

EXAMPLE 2

The effect of fortifying an epoxy novolac resin (DEN 431, Dow Chemicals) and a bisphenol-F epoxy resin (XD 7818, Dow Chemicals), as compared to the bisphenol-A resin of Example 1, was investigated. Varying concentrations of the fortifier VCDR (prepared as in Example 1) were mixed with the resins and the appropriate amounts of MDA or Tonox (trademark for a mixture of methylene dianiline and meta-phenylene diamine curing agents) and cured as in Example 1. Table 3 shows that the increases in strength observed with the bisphenol-A epoxy resin in Example 1 also occur with other epoxy resins and amine curatives.

TABLE 3

| Fortifiers VCDR, PHR | Epoxy Resin PHR | Crosslinking Amine PHR | Tensile Strength MPa | Tg °C. |
|---|---|---|---|---|
| — | DEN 431,100 | MDA, 30 | 91 (Yield) | 160 |
| 30 | DEN 431,100 | MDA, 34 | 127 (ductile) | 140 |
| — | XD 7818,100 | MDA, 32 | 91 (Yield) | 165 |
| 30 | XD 7818,100 | MDA, 37.5 | 121 (Ductile) | 141 |
| — | XD 7818,100 | Tonox, 25 | 101 (Ductile) | 157 |
| 30 | XD 7818,100 | Tonox, 34.5 | 128 (Ductile) | nd |

EXAMPLE 3

A fortifier was made from VCD and hydroquinone (HQ) at a mole ratio of 4:1 by heating at 80° C. for 30 minutes and 110° C. for 30 minutes. This fortifier (VCDHQ) was mixed in two proportions with Epon 828 and Tonox curing agent and cured as in Example 1. The results are summarised in Table 4.

TABLE 4

| Fortifier VCDHQ, PHR | Epoxy resin DEN 431 | Crosslinking Amine PHR | Tensile Strength MPa | Tg °C. |
|---|---|---|---|---|
| — | 100 | 25 | 104 | 165 |
| 20 | 100 | 28 | 125 | nd |
| 40 | 100 | 36 | 133 | 139 |

EXAMPLE 4

A fortifier was made from VCD and 1,2,3-trihydroxybenzene (pyrogallol, PYG) at a mole ratio of 6:1 by heating to 110° C. for 1 h. This fortifier (VCDPYG) was mixed at 20 PHR with Epon 828 resin and MDA curing agent and at 30 PHR with XD 7818 resin and Tonox curing agent, then cured as in Example 1. The results are summarised in Table 5.

TABLE 5

| Fortifier VCDPYG, PHR | Epoxy Resin PHR | Crosslinking Amine PHR | Tensile Strength MPa | Tg °C. |
|---|---|---|---|---|
| — | Epon 828,100 | MDA 30 | 85 (brittle) | 159 |
| 20 | Epon 828,100 | MDA 35 | 103 (Yield) | 159 |
| — | XD 7818,100 | Tonox 25 | 101 (ductile) | 157 |
| 30 | XD 7818,100 | Toxox 32 | 121 (ductile) | 150 |

EXAMPLE 5

A fortifier was made from VCD and 1,3,5-trihydroxybenzene (THB) by heating to 110° C. for 1 h. This fortifier (VCDTHB) was mixed at 30 PHR with Epon 828 and MDA curing agent, and at 30 PHR with XD 7818 resin and MDA curing agent, then cured as in Example 1. The results are summarised in Table 6.

TABLE 6

| Fortifier VCDTHB, PHR | Epoxy Resin PHR | Crosslinking Amine PHR | Tensile Strength MPa | Tg °C. |
|---|---|---|---|---|
| — | Epon 828,100 | 30 | 85 (brittle) | 159 |
| 30 | Epon 828,100 | 37 | 112 (ductile) | 151 |
| — | XD 7818,100 | 32 | 91 (yield) | 165 |
| 30 | XD 7818,100 | 37 | 115 (ductile) | 150 |

EXAMPLE 6

A nitrile-modified fortifier was made from VCD and hydroquinone at a 4:1 molar ratio as in Example 3. Succinonitrile (SN, 0.25 moles) was then added and the mixture was heated to 130°–150° C. for 30 minutes. This fortifier (VCDHQ.SN), which was a mobile liquid at room temperature and hence easy to process, was then mixed in two proportions with XD 7818 resin and Tonox curing agent, then cured as in Example 1. The results are summarised in Table 7.

TABLE 7

| Fortifier VCDHQ.SN | Epoxy Resin XD 7818,PHR | Crosslinking Amine PHR | Tensile Strength MPa | Tg °C. |
|---|---|---|---|---|
| — | 100 | 25 | 101 (ductile) | 157 |
| 30 | 100 | 32 | 126 (ductile) | 130 |
| 40 | 100 | 34 | 131 (ductile) | nd |

EXAMPLE 7

An amide-modified fortifier was made from VCD and resorcinol at a 4:1 molar ratio as described in Example 1. Acrylamide (AA, 0.5 moles) was then added and the mixture was heated to 130° C. for 30 minutes. This fortifier (VCDR.AA) was added at 30 PHR to Epon 828 resin with MDA curing agent and at 30 PHR to XD 7818 resin with MDA. The results are summarised in Table 8.

TABLE 8

| Fortifier VCDR.AA PHR | Epoxy Resin PHR | Crosslinking Amine, PHR | Tensile Strength MPa | Tg °C. |
|---|---|---|---|---|
| — | Epon 828,100 | MDA, 30 | 85 (brittle) | 159 |
| 30 | Epon 828,100 | MDA, 35.5 | 118 (ductile) | nd |
| — | XD 7818,100 | MDA, 32 | 91 (yield) | 165 |
| 30 | XD 7818,100 | MDA, 37.5 | 121 (ductile) | 141 |

EXAMPLE 8

An isocyanate-modified fortifier was made from VCD and resorcinol at a 4:1 molar ratio as described in Example 1. Phenyl isocyanate (PI, 1 mole) was added slowly at room temperature. This fortifier (VCDR.PI) was added at 20 PHR to XD 7818 resin with Tonox curing agent, and cured as in Example 1. The cured plastic had a tensile strength of 118 MPa and fractured in a ductile fashion.

EXAMPLE 9

The presence of a catalyst was found in some cases to facilitate the synthesis and processing of fortifiers. A fortifier was made from VCD and resorcinol at a 4:1 mole ratio, containing 1 wt% aminobenzhydrazide catalyst, by heating the mixture to 110° C. for 1 h. Succinonitrile (SN, 0.5 moles) was then added and the mixture heated to 130° C. for 30 minutes. This fortifier (VCDR.SN) was mixed at 30 PHR with XD 7818 resin and Tonox curing agent (34 PHR), then cured as in Example 1. The cured plastic had a tensile strength of 130 MPa, failed in a ductile fashion, and had a Tg of 145° C.

We claim:

1. An epoxy resin composition comprising:
   (a) a resin forming polyepoxide,
   (b) an amine containing cross-linking agent, and
   (c) a fortifier for epoxy resins comprising the modified reaction product formed by reacting the reaction product of:
   (i) an aromatic polyhydroxyl compound of the formula:

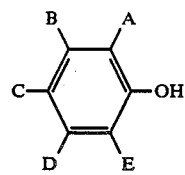

wherein A to E are selected from hydrogen, alkyl, halogen, halogenated alkyl and hydroxyl, with the proviso that at least one of A to E is hydroxyl; and
   (ii) a diepoxide containing two epoxide groups one of which is less reactive than the other, the mole ratio of (i) to (ii) being from 1:1 to 1:10;

with a ternary reactant selected from a nitrile, an amide and an isocyanate; with the proviso that the diepoxide component of the fortifier is not the same as (a).

2. The composition of claim 1 wherein the aromatic polyhydroxyl compound of the fortifier is selected from resorcinol; 1,2,3-trihydroxybenzene; 1,3,5-trihydroxybenzene; 1,2-dihydroxybenzene; hydroquinone.

3. The composition of claim 1 wherein the diepoxide reactant of the fortifier is selected from vinyl cyclohexene dioxide, limonene dioxide, p-epoxycyclopentylphenyl glycidyl ether.

4. The composition of claim 1 wherein the ternary reactant of the fortifier is a nitrile selected from acrylonitrile, succinonitrile, aminobenzonitrile, phthalonitrile, butyronitrile, malononitrile, adiponitrile, and halogenated derivatives thereof.

5. The composition of claim 1 wherein the ternary reactant of the fortifier is the amide acrylamide.

6. The composition of claim 1 wherein the ternary reactant of the fortifier is the isocyanate phenyl isocyanate.

7. The epoxy resin composition of claim 1 wherein the concentration of fortifier ranges up to about 60 parts by weight per 100 parts of resin.

8. The epoxy resin composition of claim 1 wherein the amine containing cross-linking agent is selected from the group consisting of methylene dianiline, metaphenylene diamine and mixtures of methylene dianiline and metaphenylene diamine, diethylenetriamine, triethylenetetramine, diethylaminepropylamine, polyoxypropylene amine.

9. The epoxy resin of claim 1 cured to a strong, high modulus solid form.

10. A process of preparing the composition of claim 1 comprising heating about 1 mole of the aromatic polyhydroxyl compound with from about 1–10 moles of the diepoxide at the equivalent of about 100° C.–180° C. for about 1–2 hours, and further reacting with the ternary reactant selected from:
  (iii) about 0.5 mole of nitrile at the equivalent of about one hour at about 110° C.,
  (iv) about 0.5 mole of amide at the equivalent of about 0.5 hr at about 110° C., and
  (v) about 1 mole of isocyanate slowly at about room temperature to form the fortifier;
and compounding the resulting fortifier with the resin-forming polyepoxide and the amine containing cross-linking agent.

11. The process of claim 10 wherein the ternary reactant in the fortifier is selected from succinonitrile, aminobenzonitrile, phthalonitrile, malononitrile, adiponitrile; acrylamide; and phenyl isocyanate.

* * * * *